United States Patent
Terasaka et al.

(10) Patent No.: US 9,751,509 B2
(45) Date of Patent: Sep. 5, 2017

(54) VEHICLE BRAKE CONTROL DEVICE (71) Applicant: ADVICS CO., LTD., Kariya, Aichi-pref. (JP)

(72) Inventors: Masato Terasaka, Ichinomiya (JP); Shinji Tsukamoto, Kariya (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 253 days.

(21) Appl. No.: 14/654,732

(22) PCT Filed: Dec. 25, 2013

(86) PCT No.: PCT/JP2013/084591
§ 371 (c)(1),
(2) Date: Jun. 22, 2015

(87) PCT Pub. No.: WO2014/104063
PCT Pub. Date: Jul. 3, 2014

(65) Prior Publication Data
US 2016/0193989 A1 Jul. 7, 2016

(30) Foreign Application Priority Data
Dec. 25, 2012 (JP) .................................. 2012-280863

(51) Int. Cl.
B60B 39/00 (2006.01)
B60T 8/1764 (2006.01)
B60T 8/1755 (2006.01)

(52) U.S. Cl.
CPC ........ B60T 8/1764 (2013.01); B60T 8/17551 (2013.01)

(58) Field of Classification Search
CPC ........................... B60T 8/1764; B60T 8/17636
(Continued)

(56) References Cited

U.S. PATENT DOCUMENTS 4,986,611 A * 1/1991 Goshima ............. B60T 8/17636
303/116.1
5,064,253 A * 11/1991 Kuwana ............. B60T 8/17616
303/156
(Continued)

FOREIGN PATENT DOCUMENTS

CN 1098055 A 2/1995
CN 1781786 A 6/2006
(Continued)

OTHER PUBLICATIONS

International Preliminary Report on Patentability (Form PCT/IPEA/409) issued on Apr. 7, 2015, by the International Bureau of WIPO in corresponding International Application No. PCT/JP2013/084591, and an English Language Translation of the International Preliminary Report on Patentability. (7 pages).
(Continued)

Primary Examiner — Redhwan k Mawari
(74) Attorney, Agent, or Firm — Buchanan Ingersoll & Rooney PC (57) ABSTRACT A vehicle brake control device performs select-low anti-lock brake control. In the select-low anti-lock brake control, in a decrease period, in which braking force on a first wheel that is one of left and right wheels that has a lower wheel speed is decreased, braking force on a second wheel that is one of the left and right wheels that has a higher wheel speed is also decreased. In an increase period, in which the braking force on the first wheel is increased, the braking force on the second wheel is also increased. The vehicle brake control device is configured such that, when performing the anti-lock brake control, the vehicle brake device sets the braking force on the second wheel to be greater when the tendency for instability in the vehicle behavior is small than when such tendency is large.

6 Claims, 6 Drawing Sheets (58) Field of Classification Search
 USPC .......................................... 701/71, 74, 78, 80
 See application file for complete search history.

(56) References Cited

U.S. PATENT DOCUMENTS

| | | | | |
|---|---|---|---|---|
| 5,362,139 | A * | 11/1994 | Watanabe ............. | B60T 8/1755 303/186 |
| 2001/0013723 | A1 * | 8/2001 | Takemasa ............. | B60T 8/1764 303/177 |
| 2002/0180267 | A1 * | 12/2002 | Hara ..................... | B60T 8/4081 303/187 |
| 2006/0122760 | A1 * | 6/2006 | Terasaka ............ | B60T 8/17636 701/73 |
| 2007/0029875 | A1 * | 2/2007 | Kurosaki ............. | B60T 8/1764 303/187 |
| 2008/0007115 | A1 * | 1/2008 | Mizutani ............... | B60T 8/1755 303/113.2 |
| 2010/0174453 | A1 * | 7/2010 | Takahara ................. | B60G 3/20 701/41 |
| 2010/0270855 | A1 * | 10/2010 | Sawada ................ | B60T 8/1764 303/113.2 |
| 2011/0077834 | A1 * | 3/2011 | Kudo .................... | B60T 8/1764 701/72 |
| 2011/0231076 | A1 * | 9/2011 | Watanabe ............. | B60T 8/1755 701/70 |
| 2013/0297171 | A1 * | 11/2013 | Udaka ................. | B60T 8/17616 701/70 |

FOREIGN PATENT DOCUMENTS

| | | |
|---|---|---|
| CN | 1972831 A | 5/2007 |
| DE | 10 2007 046 692 A1 | 4/2009 |
| JP | 2005-145358 A | 6/2005 |
| JP | 2005-193847 A | 7/2005 |
| JP | 2009-179322 A | 8/2009 |
| JP | 2011-73575 A | 4/2011 |
| WO | 2012/063943 A1 | 5/2002 |

OTHER PUBLICATIONS

International Search Report (PCT/ISA/210) mailed on Apr. 8, 2014, by the Japanese Patent Office as the International Searching Authority for International Application No. PCT/JP2013/084591.

Official Action dated Aug. 23, 2016, by The State Intellectual Property Office of People's Republic of China in counterpart Chinese Application No. 201380066563.4, and an English language translation of the Official Action (10 pages).

* cited by examiner

VEHICLE BRAKE CONTROL DEVICE

TECHNICAL FIELD

The present invention relates to a vehicle brake control device for performing anti-lock brake control that limits wheel lock to ensure the steering performance of the vehicle.

BACKGROUND ART

Select-low anti-lock brake control is a known anti-lock brake control. This control identifies one of right and left wheels that has a lower wheel speed and determines a control cycle that includes a decrease period, in which braking force on the right and left wheels is decreased, and an increase period, in which the braking force is increased, based on the slip amount (or slip rate) of the identified wheel.

Patent Document 1 discloses an example of a brake control device that performs select-low anti-lock brake control. When the driver applies the brakes, the controller determines based on the slip amounts of the right and left wheels whether the road surface on which the vehicle is traveling is a μ-split road surface, which refers to a road surface where the μ value of the road surface on which the left wheel is running is significantly different from the μ value of the road surface on which the right wheel is running.

Under the condition that the road surface is a μ-split road surface, when the slip amount of one of the right and left wheels that is running on the low μ surface (hereinafter also referred to as a low-μ side wheel) exceeds a first threshold, the anti-lock brake control is applied to the low-μ side wheel and also to the wheel running on the high μ surface (hereinafter also referred to as a high-μ side wheel). The braking forces applied to the low-μ side wheel and the high-μ side wheel are decreased in a decrease period, which is determined based on the slip amount of the low-μ side wheel, and increased in an increase period.

Further, in this brake control device, the tendency of the high-μ side wheel to lock is observed. Specifically, if the slip amount of the high-μ side wheel does not exceed a second threshold, which is less than the first threshold, in one control cycle including the previous increase period, the high-μ side wheel is determined to have less tendency to lock. Thus, the increase gradient of the braking force on the high-μ side wheel in the current increase period is set to be steeper than the increase gradient of the braking force on the high-μ side wheel in the previous increase period. If the slip amount of the high-μ side wheel exceeds the second threshold in one control cycle including the previous increase period, the high-μ side wheel is determined to have tendency to lock. Thus, the increase gradient of the braking force on the high-μ side wheel in the current increase period is set to be less steep than the increase gradient of the braking force on the high-μ side wheel in the previous increase period. This ensures the stability of behavior of the vehicle travelling on the μ-split road surface.

PRIOR ART DOCUMENTS

Patent Documents

Patent Document 1: Japanese Laid-Open Patent Publication No. 2009-179322

SUMMARY OF THE INVENTION

Problems that the Invention is to Solve

In recent years, when such anti-lock brake control is applied to a vehicle travelling on a μ-split road surface, the deceleration of the vehicle is desired to be increased while ensuring the stability of the vehicle behavior.

It is an objective of the present invention to provide a vehicle brake control device that is capable of, when performing select-low anti-lock brake control in a vehicle that is travelling on a μ-split road surface, increasing the deceleration of the vehicle while ensuring the stability of the vehicle behavior.

Means for Solving the Problems

To achieve the foregoing objective and in accordance with one aspect of the present invention a vehicle brake control device that performs select-low anti-lock brake control is provided. In a decrease period, in which braking force on a first wheel that is one of right and left wheels that has a lower wheel speed is decreased, braking force on a second wheel that is one of the right and left wheels that has a higher wheel speed is also decreased. In an increase period, in which the braking force on the first wheel increased, the braking force on the second wheel is also increased. The vehicle brake control device is configured such that, when performing the anti-lock brake control, the vehicle brake control device sets the braking force on the second wheel to be greater when a tendency for instability in the behavior of the vehicle is small than when such tendency is large.

When braking force is applied to the right and left wheels while the vehicle is travelling on a μ-split road surface, the low-μ side wheel, which is the wheel running on a low μ surface, tends to be the first wheel, and the high-μ side wheel, which is the wheel running on a high μ surface, tends to be the second wheel. Under such a condition, when the slip amount of the low-μ side wheel is increased and the start condition of the anti-lock brake control is satisfied, not only the braking force on the low-μ side wheel but also the braking force on the high-μ side wheel is adjusted. In the decrease period in which the braking force on the low-μ side wheel is decreased, the braking force on the high-μ side wheel is also decreased. In the increase period in which the braking force on the low-μ side wheel is increased, the braking force on the high-μ side wheel is also increased.

During such select-low anti-lock brake control, the braking force on the high-μ side wheel, which is the second wheel, is greater when the tendency for instability in the vehicle behavior is small than when such tendency is large. Thus, under the condition that the vehicle behavior is stable, the overall braking force applied to the vehicle tends to be greater. Accordingly, when the select-low anti-lock brake control is executed in a vehicle travelling on a μ-split road surface, the deceleration of the vehicle can be increased while ensuring the stability of the vehicle behavior.

In the decrease period that is determined by the slip amount of the low-μ side wheel, which is the first wheel, there may be a case where the high-μ side wheel does not show the tendency to lock. In this case, the overall braking force applied to the vehicle can be increased by minimizing the decrease amount of the braking force on the high-μ side wheel in the decrease period. Thus, it is preferable that a decrease amount of the braking force on the second wheel in the decrease period be set to be smaller when the tendency for instability in the vehicle behavior is small than when such tendency is large. In such a structure, when the select-low anti-lock brake control is being executed in a vehicle travelling on a μ-split road surface, the braking force on the high-μ side wheel, which is the second wheel, does not easily decrease under the condition that the vehicle behavior is stable. This increases the overall braking force applied to the vehicle. Thus, the deceleration of the vehicle can be increased while ensuring the stability of the vehicle behavior.

The decrease amount can be set by multiplying a preset basic decrease amount by a decrease correction coefficient, for example. In this case, the decrease correction coefficient may be set to be smaller when the tendency for instability in the vehicle behavior is small than when such tendency is large.

In the above described vehicle brake control device, it is preferable that an increase amount of the braking force on the second wheel in the increase period be set to be greater when the tendency for instability in the vehicle behavior is small than when such tendency is large. In such a structure, when the select-low anti-lock brake control is being executed in a vehicle travelling on a μ-split road surface, the braking force on the high-μ side wheel, which is the second wheel, tends to increase under the condition that the vehicle behavior is stable. This allows the overall braking force applied to the vehicle to be increased. Thus, the deceleration of the vehicle can be increased while ensuring the stability of the vehicle behavior.

The increase amount can be set by multiplying a preset basic increase amount by an increase correction coefficient, for example. In this case, the increase correction coefficient may be set to be greater when a tendency for instability in the vehicle behavior is small than when the tendency for instability in the vehicle behavior is large.

In the above described vehicle brake control device, the tendency for instability in the vehicle behavior may be determined such that the smaller a difference between a target yaw rate, which is set according to a condition of vehicle operation, and a yaw rate of the vehicle, the smaller the tendency for instability in the vehicle behavior becomes. In this configuration, when the vehicle yaw moment created by the execution of the solect-low anti-lock brake control is small, the vehicle behavior is determined to be stable, and thus the braking force on the high-μ side wheel is easily increased. Accordingly, the deceleration of the vehicle can be increased while ensuring the stability of the vehicle behavior.

MODES FOR CARRYING OUT THE INVENTION

A vehicle brake control device according to one embodiment will now be described with reference to the drawings.

Figure 1:
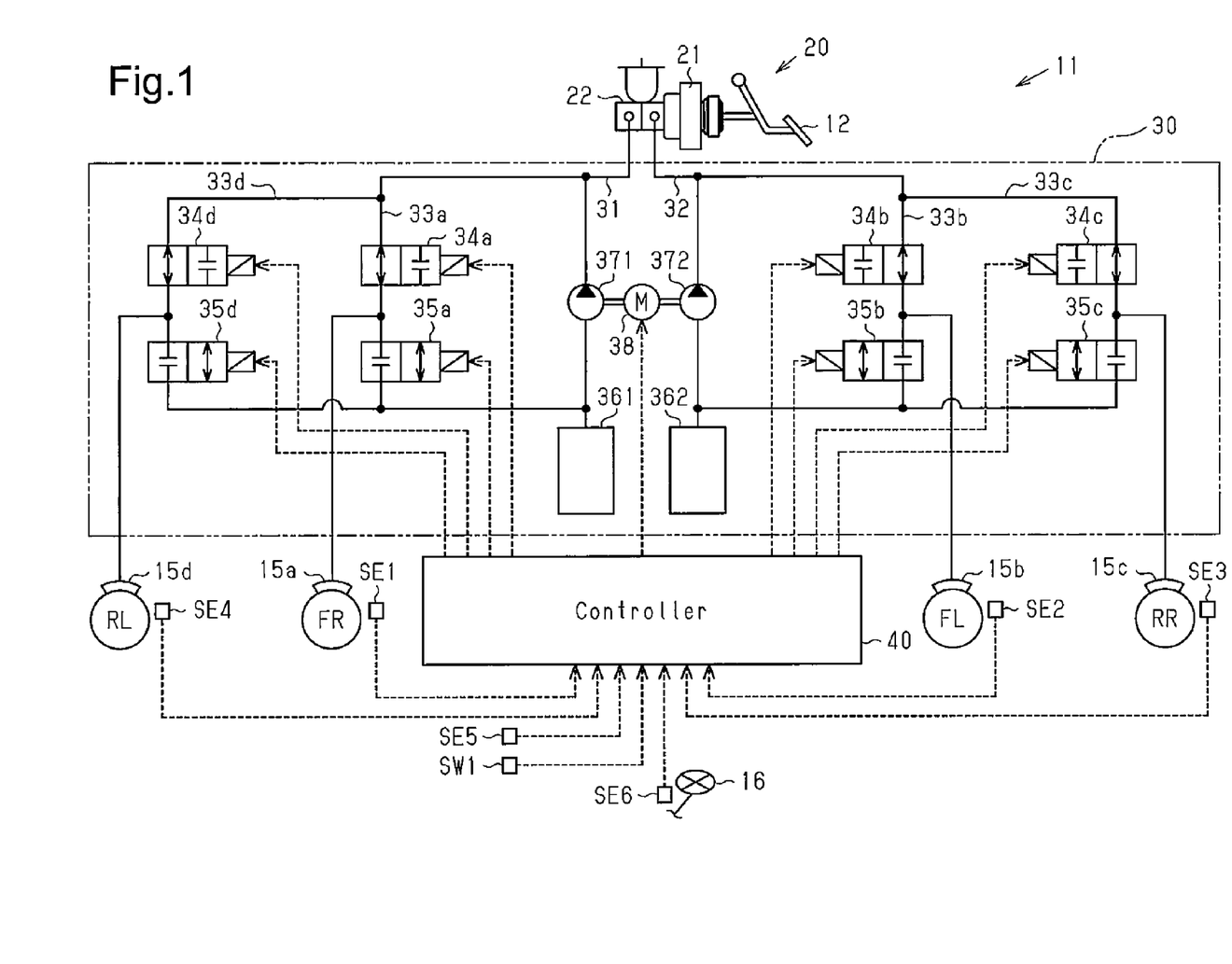
FIG. 1 is a schematic block diagram showing a braking device including a controller that is an embodiment of a vehicle brake control device.

As shown in FIG. 1, a braking device 11 is installed in a vehicle that has a plurality of (four in the present embodiment) wheels (a front right wheel FR, a front left wheel FL, a rear right wheel RR, and a rear left wheel RL). The braking device 11 includes a fluid-pressure generating device 20, to which a brake pedal 12 is coupled, a brake actuator 30, which adjusts braking force on the wheels FR, FL, RR and RL, and a controller 40, which is an example of a brake control device and controls the brake actuator 30.

The fluid-pressure generating device 20 includes a booster 21, which boosts the braking force applied by the driver on the brake pedal 12, and a master cylinder 22, which generates brake fluid pressure (hereinafter also referred to as MC pressure) in accordance with the braking force boosted by the booster 21. When the driver is applying brakes, the master cylinder 22 delivers brake fluid in accordance with the MC pressure, which is generated in the master cylinder 22, to wheel cylinders 15a, 15b, 15c and 15d, which are associated with the wheels FR, FL, RR, and RL, respectively, through the brake actuator 30. Each of the wheels FR, FL, RR and RL receives braking force that is in accordance with the brake fluid pressure (hereinafter also referred to as WC pressure) generated in the associated one of the wheel cylinders 15a to 15d.

The brake actuator 30 includes a first fluid pressure circuit 31, which is connected to the wheel cylinder 15a for the front right wheel and the wheel cylinder 15d for the rear left wheel, and a second fluid pressure circuit 32, which is connected to the wheel cylinder 15b for the front left wheel and the wheel cylinder 15c for the rear right wheel. The first fluid pressure circuit 31 includes a line 33a for the front right wheel and a line 33d for the rear left wheel. The second fluid pressure circuit 32 includes a line 33b for the front left wheel and a line 33c for the rear right wheel. The lines 33a to 33d include booster valves 34a, 34b, 34c and 34d, which are normally open solenoid valves that operate to regulate increases in the WC pressures of the wheel cylinders 15a to 15d, and decompression valves 35a, 35b, 35c and 35d, which are normally closed solenoid valves that operate to decrease the WC pressures.

The fluid pressure circuits 31 and 32 include reservoirs 361 and 362 and pumps 371 and 372. The reservoirs 361 and 362 temporarily store the brake fluid received from the wheel cylinder 15a to 15d through the decompression valves 35a to 35d. The pumps 371 and 372 draw in the brake fluid that is temporarily stored in the reservoirs 361 and 362 and discharge the brake fluid into the fluid pressure circuits 31 and 32 toward the master cylinder 22. The pump 371 and 372 are operated by a common drive motor 38.

The controller 40 will now be described.

The input interface of the controller 40 is electrically connected to wheel speed sensors SE1, SE2, SE3 and SE4, which detect the wheel speeds VW of the wheels FR, FL, RR and RL, and a yaw rate sensor SE5, which detects the yaw rate Yr of the vehicle. In addition, the input interface is electrically connected to a steering angle sensor SE6, which detects the steering angle □ of the steering wheel 16, and a brake switch SW1, which detects whether the brake pedal 12 is operated. The output interface of the controller 40 is electrically connected to the valves 34a to 34d and 35a to 35d and the drive motor 38. The controller 40 controls the valve 34a to 34d and 35a to 35d and the drive motor 38 based on various detection signals received from the sensors SE1 to SE6 and brake switch SW1.

The controller 40 includes a microcomputer, which includes a CPU, a ROM, a RAM, and the like. The ROM pre-stores various control processes to be executed by the CPU, various maps, and various thresholds. The RAM stores various information (such as vehicle speed VS) that is rewritten as necessary when the ignition switch (not shown) of the vehicle is on.

In the vehicle of the present embodiment, anti-lock brake control (hereinafter also referred to as ABS control) is independently applied to each of the front right wheel FR and the front left wheel FL, and select-low ABS control is applied to the rear wheels RR and RL. In the independent ABS control on the right and left wheels, when braking by the driver causes the slip amount Slp of the front right wheel FR to become greater than or equal to a slip determination value SlpTh, for example, the ABS control on the front right wheel FR starts. Here, if the slip amount Slp of the front left wheel FL is less than the slip determination value SlpTh, the ABS control is not applied to the front left wheel FL.

In contrast, in the select-low ABS control, when braking by the driver causes the slip amount Slp of at least one of the right and left rear wheels RR and RL to become greater than or equal to the slip determination value SlpTh, the ABS control starts on both of the rear wheels RR and RL. A common control cycle is used for the rear wheels RR and RL. Thus, in a pressure decrease period PD, in which the WC pressure of the wheel cylinder 15c, which is associated with the rear right wheel RR, is decreased, for example, the WC pressure of the wheel cylinder 15d, which is associated with the rear left wheel RL, is also decreased. In a pressure keeping period PR in which the WC pressure of the wheel cylinder 15c, which is associated with the rear right wheel RR, is held, the WC pressure of the wheel cylinder 15d, which is associated with the rear left wheel RL, is also held. Further, in a pressure increase period PI in which the WC pressure of the wheel cylinder 15c, which is associated with the rear right wheel RR, is increased, the WC pressure of the wheel cylinder 15d, which is associated with the rear left wheel RL, is also increased.

In a vehicle that controls the braking force on the wheels by adjusting the WC pressures of wheel cylinders, the pressure decrease period PD serves as a decrease period, in which the braking force on the rear wheels RR and RL is decreased. The pressure keeping period PR serves as a keeping period, in which the braking force on the rear wheels RR and RL is maintained. The pressure increase period PI serves as an increase period, in which the braking force on the rear wheels RR and RL is increased. In the following descriptions, WC pressure of a wheel cylinder that is associated with a wheel is referred to as WC pressure for a wheel.

The deceleration of a wheel caused by braking by the driver depends on factors including the WC pressure for the wheel and the μ value of the road surface on which the wheel is running. Thus, when the driver applies the brakes while the vehicle is traveling on a μ-split road surface, the deceleration of the wheel that is running on a low a road surface LFW (hereinafter also referred to as low-μ side wheel) tends to be greater than the deceleration of the wheel that is running on a high μ road surface HFW (hereinafter also referred to as high-μ side wheel). That is, the slip amount Slp of the low-μ side wheel LFW tends to be greater than the slip amount Slp of the high-μ side wheel HFW. Thus, when the select-low ABS control is executed while the vehicle is traveling on a μ-split road surface, the control cycle, which includes a pressure decrease period PD and a pressure increase period PI (and a pressure keeping period PR), is likely to be set depending on the slip amount Slp of the low-μ side wheel LFW. The μ-split road surface is a road surface where the μ value of the road surface on which the left wheels FL and RL are running significantly differs from the μ value of the road surface on which the right wheels FR and RR are running.

When the control cycle is determined based on the fluctuations in the slip amount Sip of the low-μ side wheel LFW, the WC pressure for the high-μ side wheel HFW is decreased in the pressure decrease period PD even if the slip amount Slp of the high-μ side wheel HFW is still low, or the high-μ side wheel HFW shows low or no tendency to lock. That is, the braking force on the high-μ side wheel HFW, which shows less tendency to lock, is influenced by the slip amount Slp of the low-μ side wheel LFW, which shows more tendency to lock.

Thus, in the present embodiment, the tendency for instability in the vehicle behavior is observed during the select-low ABS control, and the braking force on the high-μ side wheel HFW is maximized while ensuring the stability of the vehicle behavior. In the pressure decrease period PD, the pressure decrease amount of the WC pressure for the high-μ side wheel HFW is set to be smaller when the tendency for instability in the vehicle behavior is small than when such tendency is large. For example, the pressure decrease amount of the WC pressure for the high-μ side wheel HFW during the pressure decrease period PD is set by multiplying a basic pressure decrease amount BDP, which is a preset basic decrease amount, by a pressure decrease gain KREL, which is a decrease correction coefficient that is determined according to the degree of the tendency for instability in the vehicle behavior.

In the pressure increase period PI, the pressure increase amount for the high-μ side wheel HFW is set to be greater when the tendency for instability in the vehicle behavior is small than when such tendency is large. For example, the pressure increase amount of the WC pressure for the high-μ side wheel HFW during the pressure increase period PI is set by multiplying a basic pressure increase amount BBP, which is a preset basic increase amount, by a pressure increase gain KAPP, which is an increase correction coefficient that is determined according to the degree of the tendency for instability in the vehicle behavior.

Increase and decrease in the WC pressure for the high-μ side wheel HFW during the pressure decrease period PD and the pressure increase period PI are adjusted based on the degree of the tendency for instability in the vehicle behavior. This increases the overall braking force applied to the vehicle while ensuring the stability of the vehicle behavior even when the select-low ABS control is performed, thereby reducing the stopping distance of the vehicle.

In the present embodiment, a yaw rate deviation ΔYr is used as a parameter that indicates the tendency for instability in the vehicle behavior. The yaw rate deviation ΔYr is obtained by substituting a target yaw rate Yr_Trg, which is set according to the condition of the vehicle operation by the driver, and a yaw rate Yr, which is detected by the yaw rate sensor SE5, into the relational expression (1) shown below. The greater the absolute value of yaw rate deviation |ΔYr|, the greater the assumed tendency for instability in the vehicle behavior.

$$\Delta Yr = Yr\_Trg - Yr \quad (1)$$

The target yaw rate Yr_Trg is in accordance with the steering angle θ of the steering wheel 16 and the vehicle speed VS of the vehicle and calculated using the relational expression (2) shown below. In this relational expression (2), SF represents the stability factor of the vehicle, N represents the gear ratio of the vehicle steering device, and WB represents the vehicle wheelbase.

$$Yr\_Trg = \frac{VS}{1 + SF \cdot VS^2} \cdot \frac{\theta}{N \cdot WB} \quad (2)$$

Figure 2:
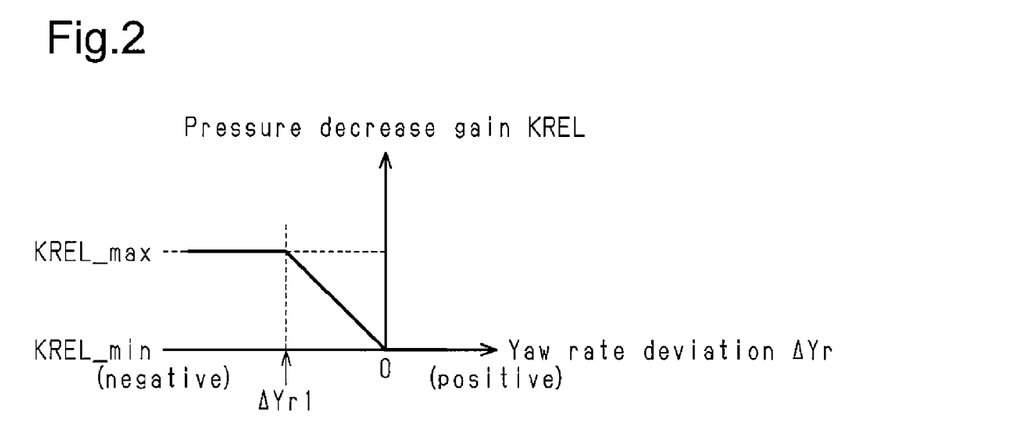
FIG. 2 is a map showing the relationship between a yaw rate deviation and a pressure decrease gain.

Referring to FIG. 2, the map for determining the pressure decrease gain KREL will now be described. of the tendency for instability in the vehicle behavior. This increases the overall braking force applied to the vehicle while ensuring the stability of the vehicle behavior even when the select-low ABS control is performed, thereby reducing the stopping distance of the vehicle.

In the present embodiment, a yaw rate deviation ΔYr is used as a parameter that indicates the tendency for instability in the vehicle behavior. The yaw rate deviation ΔYr is obtained by substituting a target yaw rate Yr_Trg, which is set according to the condition of the vehicle operation by the driver, and a yaw rate Yr, which is detected by the yaw rate sensor SE5, into the relational expression (1) shown below. The greater the absolute value of yaw rate deviation |ΔYr|, the greater the assumed tendency for instability in the vehicle behavior.

$$\Delta Yr = Yr\_Trg - Yr \quad (1)$$

The target yaw rate Yr_Trg is in accordance with the steering angle θ of the steering wheel 16 and the vehicle speed VS of the vehicle and calculated using the relational expression (2) shown below. In this relational expression (2), SF represents the stability factor of the vehicle, N represents the gear ratio of the vehicle steering device, and WB represents the vehicle wheelbase.

$$Yr\_Trg = \frac{VS}{1 + SF \cdot VS^2} \cdot \frac{\theta}{N \cdot WB} \quad (2)$$

Referring to FIG. 2, the map for determining the pressure decrease gain KREL will now be described.

The map of FIG. 2 shows the relationship between the yaw rate deviation ΔYr and the pressure decrease gain KREL. As shown in FIG. 2, the pressure decrease gain KREL is set to a minimum value KREL_min when the yaw rate deviation ΔYr is 0 (zero) and set to a maximum value KREL_max, which is greater than the minimum value KREL_min, when the yaw rate deviation ΔYr is less than a first value ΔYr1, which is less than 0 (zero). When the yaw rate deviation ΔYr is less than 0 (zero) and greater than or equal to the first value ΔYr1, the smaller the yaw rate deviation ΔYr, the greater the pressure decrease gain KREL is determined to be.

The minimum value KREL_min of the pressure decrease gain is preferably set to a value greater than or equal to 0 (zero) and less than 1. Thus, when the yaw rate deviation ΔYr is close to 0 (zero), the pressure decrease amount of the WC pressure for the high-μ side wheel HFW in the pressure decrease period PD is set to a small value. In the present embodiment, the minimum value KREL_min of the pressure decrease gain is 0 (zero). Thus, when the yaw rate deviation ΔYr is 0 (zero), the WC pressure for the high-μ side wheel HFW is not decreased during the pressure decrease period PD.

On the other hand, the maximum value KREL_max of the pressure decrease gain is preferably set to be greater than or equal to 1. Thus, when the yaw rate deviation ΔYr is a small value, the pressure decrease amount of the WC pressure for the high-μ side wheel HFW during the pressure decrease period PD is set to a large value. In the present embodiment, the maximum value KREL_max of the pressure decrease gain is 1.

Figure 3:
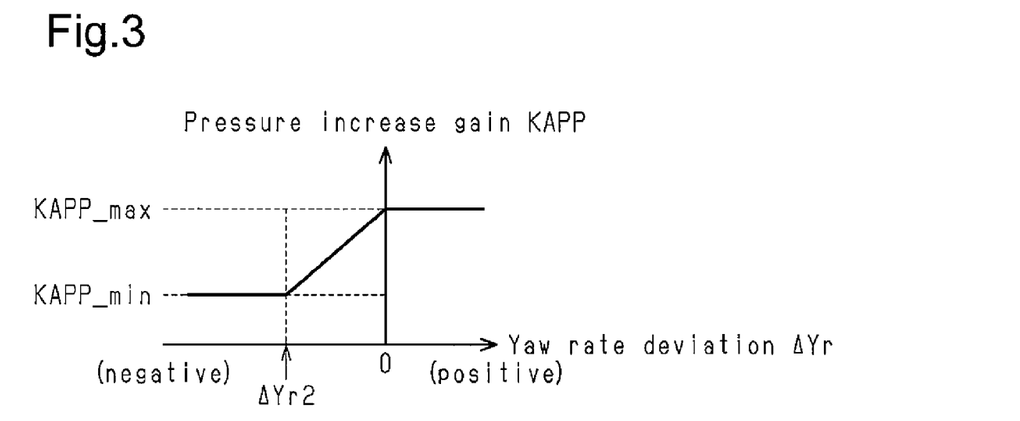
FIG. 3 is a map showing the relationship between a yaw rate deviation and a pressure increase gain.

Referring to FIG. 3, the map for determining the pressure increase gain KAPP will now be described.

The map of FIG. 3 shows the relationship between the yaw rate deviation ΔYr and the pressure increase gain KAPP. As shown in FIG. 3, the pressure increase gain KAPP is set to a maximum value KAPP_max when the yaw rate deviation ΔYr is 0 (zero) and set to a minimum value KAPP_min, which is less than the maximum value KAPP_max, when the yaw rate deviation ΔYr is less than a second value ΔYr2, which is less than 0 (zero). When the yaw rate deviation ΔYr is less than 0 (zero) and greater than or equal to the second value ΔYr2, the smaller the yaw rate deviation ΔYr, the smaller the pressure increase gain KAPP is determined to be. The second value ΔYr2 may be equal to the first value ΔYr1 described above or different from the first value ΔYr1.

The maximum value KAPP_max of the pressure increase gain is preferably set to be greater than or equal to 1. Thus, when the yaw rate deviation ΔYr is close to 0 (zero), the pressure increase amount of the WC pressure for the high-μ side wheel HFW during the pressure increase period PI is set to a large value. In the present embodiment, the maximum value KAPP_max of the pressure increase gain is 1.5.

On the other hand, the minimum value KAPP_min of the pressure increase gain is preferably set to be less than 1 and greater than or equal to 0 (zero). Thus, when the yaw rate deviation ΔYr is a small value, the pressure increase amount of the WC pressure for the high-μ side wheel HFW during the pressure increase period PI is set to a small value. In particular, if the minimum value KAPP_min is 0 (zero) and the yaw rate deviation ΔYr is less than or equal to the second value ΔYr2, the WC pressure for the high-μ side wheel HFW is not increased during the pressure increase period PI. In the present embodiment, the minimum value KAPP_min of the pressure increase gain is 0.5.

Referring to the flowcharts in FIGS. 4 to 7, the process routines executed by the controller 40 to perform the select-low ABS control will now be described. The process routine shown in FIG. 4 is the main process routine for the ABS control and executed in predetermined cycles.

First, referring to the flowchart of FIG. 4, the main process routine is described as follows.

Figure 4:
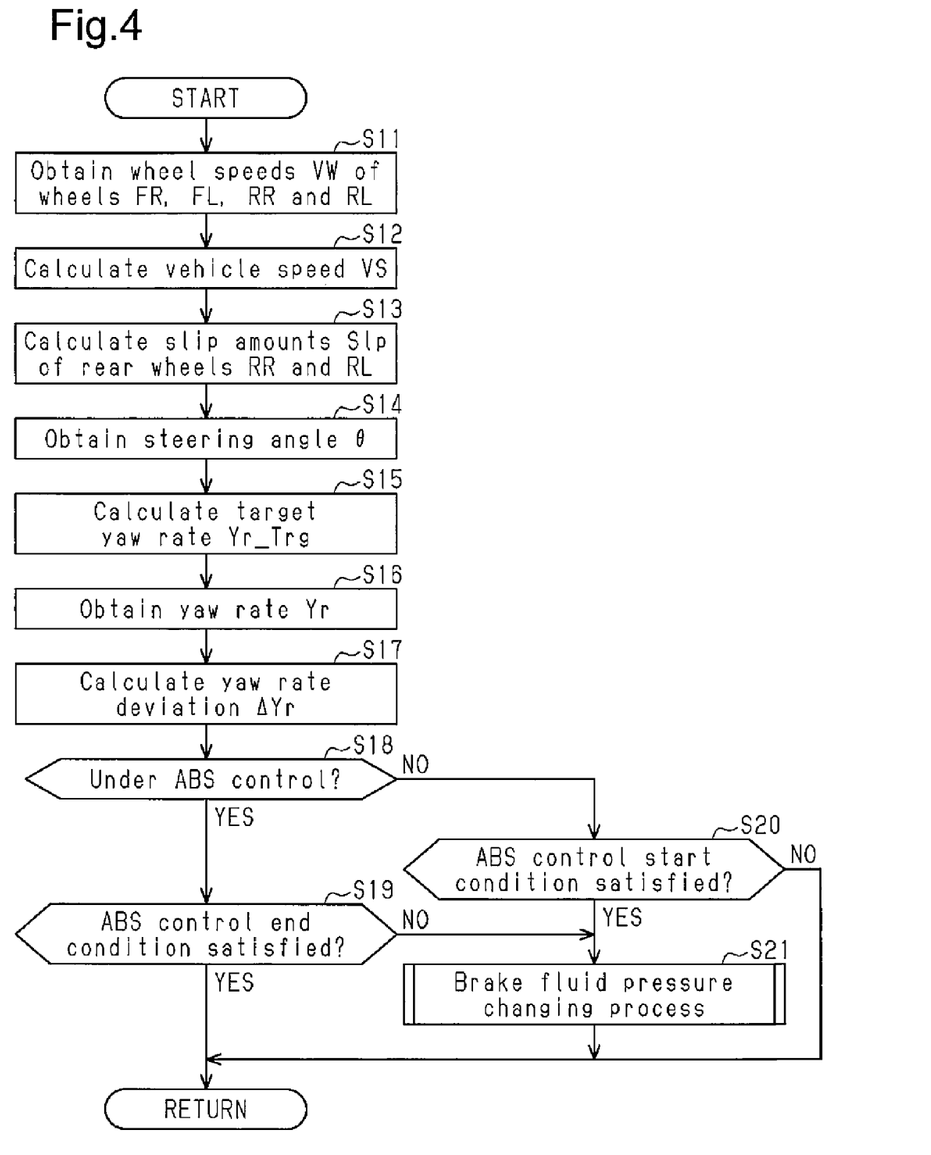
FIG. 4 is a flowchart illustrating a process routine that is executed by the controller to perform select-low anti-lock brake control.

As shown in FIG. 4, in this process routine, the controller 40 obtains the wheel speeds VW of the wheels FR, FL, RR and RL, which are based on the detection signals from the wheel speed sensors SE1 to SE4 (step S11). Then, the controller 40 calculates the vehicle speed VS based on at least one of the wheel speeds VW of the wheels FR, FL, RR and RL (step S12). The controller 40 then calculates the slip amounts Slp of the rear wheels RR and RL (step S13). Specifically, the controller 40 sets the value obtained by subtracting the wheel speed VW of the rear right wheel RR from the vehicle speed VS as the slip amount Slp of the rear right wheel RR, and sets the value obtained by subtracting the wheel speed VW of the rear left wheel RL from the vehicle speed VS as the slip amount Slp of the rear left wheel RL.

Then, the controller 40 obtains the steering angle θ of the steering wheel 16, which is based on the detection signal from the steering angle sensor SE6 (step S14), and calculates the target yaw rate Yr_Trg by substituting the vehicle speed VS and the steering angle θ into the relational expression (2) (step S15). The controller 40 then obtains the yaw rate Yr, which is based on the detection signal from the yaw rate sensor SE5 (step S16), and calculates the yaw rate deviation ΔYr by substituting the target yaw rate Yr_Trg and the yaw rate Yr into the relational expression (1) (step S17).

Then, the controller 40 determines whether the select-low ABS control is being executed (step S18). If the ABS control is being executed (step S18: YES), the controller 40 determines whether the end condition of the select-low ABS control is satisfied (step S19). If the ABS control is not being executed (step S18: NO), the controller 40 determines whether the start condition of the select-low ABS control is satisfied (step S20).

The start condition of the select-low ABS control is satisfied when the condition that the driver is applying brakes and the condition that the slip amount Slp of at least one of the rear wheels RR and RL is greater than or equal to the Slip determination value SlpTh are both satisfied. The end condition of the select-low ABS control is satisfied when one of the condition that the vehicle stops and the condition that the driver stops applying the brakes is satisfied.

In step S19, if the end condition of the ABS control is not satisfied (Step S19: NO), the process of the controller 40 moves to step S21, which will be described below. If the end condition of the ABS control is satisfied (step S19: YES), the controller 40 temporarily ends the process routine. Then, after operating the pumps 371 and 372 until no brake fluid remains in the reservoirs 361 and 362, the controller 40 performs the end process for stopping the pumps 371 and 372.

In step S20, if the start condition of the ABS control is not satisfied (step S20: NO), the controller 40 temporarily ends the process routine. If the start condition of the ABS control is satisfied (step S20: YES), the process of the controller 40 moves to step S21.

In step S21, the controller 40 performs a brake fluid pressure changing process for changing the WC pressures for the rear wheels RR and RL individually. The brake fluid pressure changing process will be described below referring to FIG. 5. Then, the controller 40 temporarily ends the process routine.

Referring to the flowchart of FIG. 5, the brake fluid pressure changing process routine in step S21 will now be described.

Figure 5:
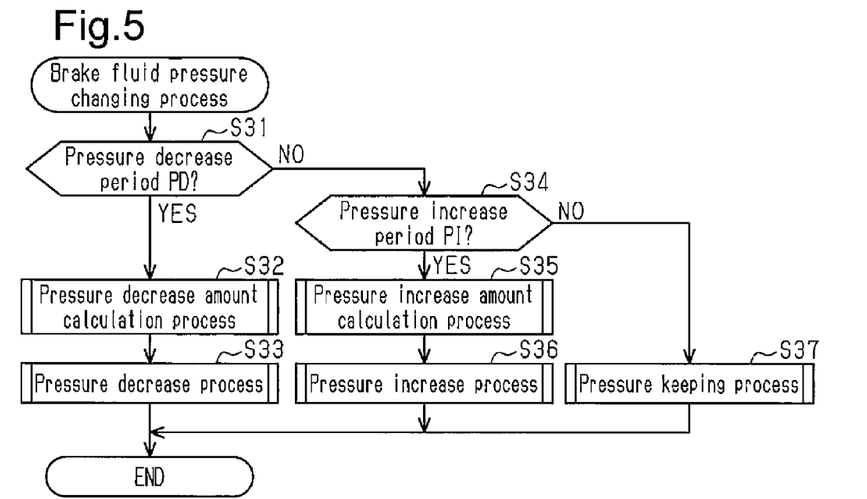
FIG. 5 is a flowchart illustrating a process routine for changing brake fluid pressure.

As shown in FIG. 5, in this process routine, the controller 40 determines whether the current period is a pressure decrease period PD (step S31). If the current period is a pressure decrease period PD (step S31: YES), the controller 40 performs a pressure decrease amount calculation process for calculating the pressure decrease amounts DP_RR and DP_RL of the WC pressures for the rear wheels RR and RL (step S32). The pressure decrease amount calculation process will be described below referring to FIG. 6.

Then, the controller 40 performs a pressure decrease process for decreasing the WC pressures for the rear wheels RR and RL based on the calculated pressure decrease amounts DP_RR and DP_RL (step S33). In the pressure decrease process, the controller 40 closes the booster valves 34c and 34d, which are associated with the rear wheels RR and RL, and opens the associated decompression valves 35c and 35d while maintaining the pumps 371 and 372 in operation. The booster valves 34a to 34d and the decompression valves 35a to 35d are controlled by pulse width modulation (PWM). The controller 40 sets the duty cycle of the control signal that is given to the solenoid of the decompression valve 35c such that the greater the pressure decrease amount DP_RR, the greater the duty cycle becomes. The controller 40 also sets the duty cycle of the control signal that is given to the solenoid of the decompression valve 35d such that the greater the pressure decrease amount DP_RL, the greater the duty cycle becomes. Further, the controller 40 sets the duty cycle of control signals that are given to the solenoids of the booster valves 34c and 34d to 100%, for example. Then, the controller 40 temporarily ends the process routine.

If the current period is not a pressure decrease period PD in step S31 (step S31: NO), the controller 40 determines whether the current period is a pressure increase period PI (step S34). If the current period is a pressure increase period PI (step S34: YES), the controller 40 performs a pressure increase amount calculation process for calculating the pressure increase amounts BP_RR and BP_RL of the WC pressures for the rear wheels RR and RL (step S35). The pressure increase amount calculation process will be described below referring to FIG. 7.

Then, the controller 40 performs a pressure increase process for increasing the WC pressures for the rear wheels RR and RL based on the calculated pressure increase amounts BP_RR and BP_RL (step S36). In the pressure increase process, the controller 40 opens the booster valves 34c and 34d, which are associated with the rear wheels RR and RL, and closes the associated decompression valves 35c and 35d while maintaining the pumps 371 and 372 in operation. The controller 40 sets the duty cycle of the control signal that is given to the solenoid of the booster valve 34c such that the greater the pressure increase amount BP_RR, the smaller the duty cycle becomes. The controller 40 also sets the duty cycle of the control signal that is given to the solenoid of the booster valve 34d such that the greater the pressure increase amount BP_RL, the smaller the duty cycle becomes. Further, the controller 40 sets the duty cycle of control signals that are given to the solenoids of the decompression valves 35c and 35d to 0%. Then, the controller 40 temporarily ends the process routine.

If the current period is not a pressure increase period PI in step S34 (step S34: NO), the current period is a pressure keeping period PR. Thus, the controller 40 performs a pressure keeping process for keeping the WC pressures for the rear wheels RR and RL (step S37). In the pressure keeping process, the controller 40 closes the booster valves 34c and 34d and the decompression valves 35c and 35d that are associated with the rear wheels RR and RL while maintaining the pumps 371 and 372 in operation. That is, the controller 40 sets the duty cycle of the control signals given to the solenoids of the booster valves 34c and 34d to 100% and sets the duty cycle of the control signals given to the solenoids of the decompression valves 35c and 35d to 0%, for example. The controller 40 then temporarily ends the process routine.

Referring to the flowchart of FIG. 6, the pressure decrease amount calculation process routine in step S32 will now be described.

Figure 6:
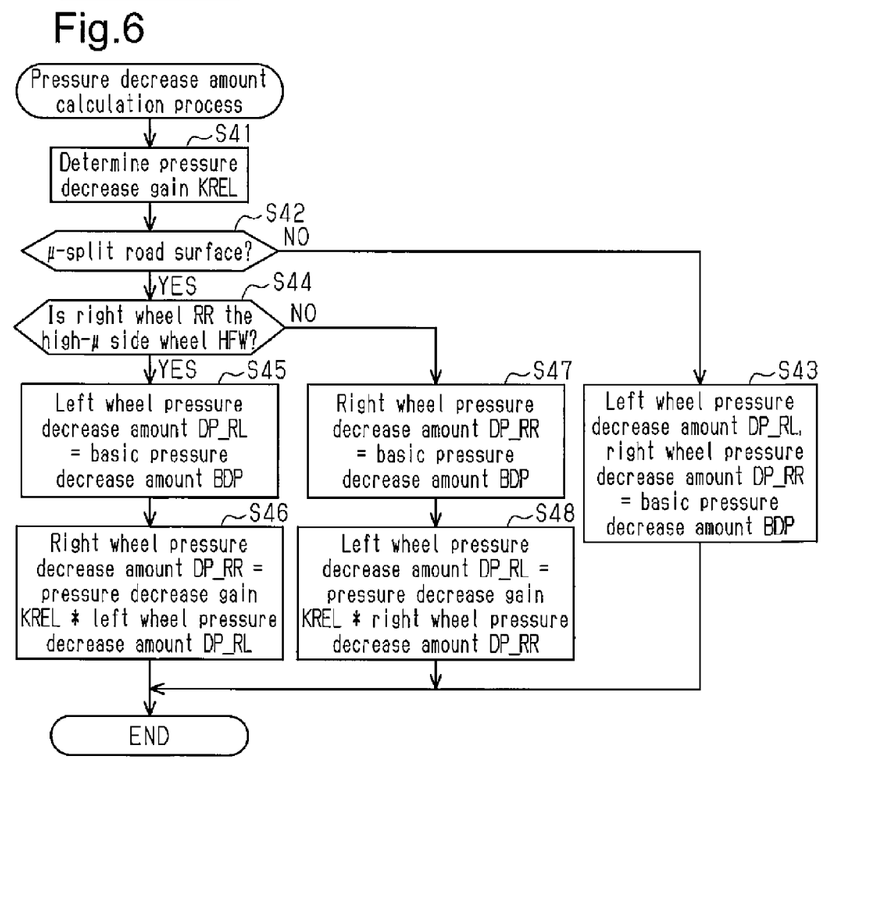
FIG. 6 is a flowchart illustrating a process routine for calculating a pressure decrease amount.

As shown in FIG. 6, in this process routine, the controller 40 uses the map of FIG. 2 and determines the pressure decrease gain KREL according to the yaw rate deviation ΔYr calculated in step S17 (step S41). That is, in step S41, the pressure decrease gain KREL is set to be smaller when the yaw rate deviation ΔYr is large than when the yaw rate deviation ΔYr is small.

Next, the controller 40 determines whether the road surface on which the vehicle is traveling is a μ-split road surface (step S42). For example, the controller 40 calculates the difference between the slip amount Sip of the rear right wheel RR and the slip amount Slp of the rear left wheel RL and determines whether the difference is greater than or equal to a predetermined μ-split road surface determination value. When the calculated difference is greater than or equal to the μ-split road surface determination value, the road surface is determined to be a μ-split road surface. When the calculated difference is less than the μ-split road surface determination value, the road surface is determined not to be a μ-split road surface.

If the road surface is not a μ-split road surface (step S42: NO), the controller 40 sets the right wheel pressure decrease amount DP_RR and the left wheel pressure decrease amount DP_RL to a predetermined basic pressure decrease amount BDP (step S43) and temporarily ends the process routine.

If the road surface is a μ-split road surface (step S42: YES), the controller 40 determines whether the rear right wheel RR is the high-μ side wheel HFW (step S44). In other words, in step S44, the controller 40 determines whether the rear right wheel RR is a second wheel that is one of the right and left rear wheels RR and RL that has a higher wheel speed VW. If the rear right wheel RR is the high-μ side wheel HFW (step S44: YES), the rear right wheel RR is the second wheel, and the rear left wheel RL is the first wheel. Thus, the controller 40 sets the left wheel pressure decrease amount DP_RL to the basic pressure decrease amount BDP (step S45). Then, the controller 40 multiplies the set left wheel pressure decrease amount DP_RL (the basic pressure decrease amount BDP) by the pressure decrease gain KREL determined in step S41 and sets the result of multiplication as the right wheel pressure decrease amount DP_RR (step S46). The controller 40 then temporarily ends the process routine.

If the rear left wheel RL is the high-μ side wheel (step S44: No), the rear right wheel RR is the first wheel, and the rear left wheel RL is the second wheel. Thus, the controller 40 sets the right wheel pressure decrease amount DP_RR to the basic pressure decrease amount BDP (step S47). Then, the controller 40 multiplies the set right wheel pressure decrease amount DP_RR (the basic pressure decrease amount BDP) by the pressure decrease gain KREL determined in step S41 and sets the result of multiplication as the left wheel pressure decrease amount DP_RL (step S48). The controller 40 then temporarily ends the process routine.

Figure 7:
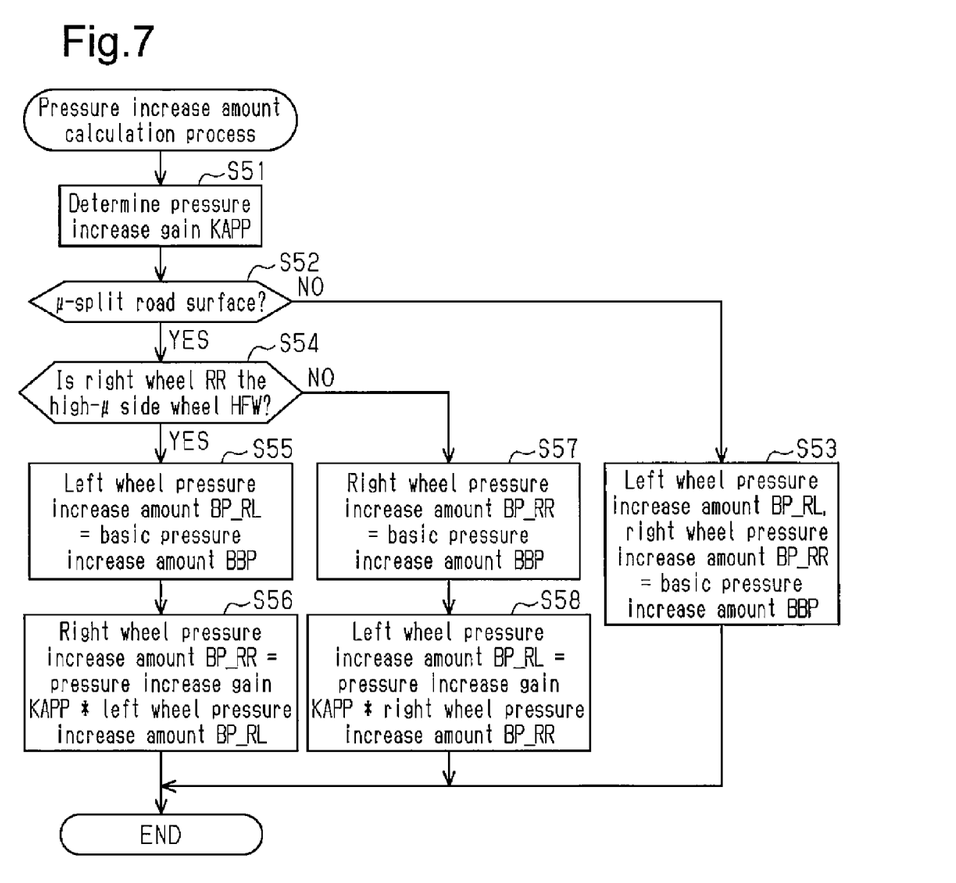
FIG. 7 is a flowchart illustrating a process routine for calculating a pressure increase amount.

Referring to FIG. 7, the pressure increase amount calculation process routine in step S35 will now be described.

As shown in FIG. 7, in this process routine, the controller 40 uses the map of FIG. 3 and determines the pressure increase gain KAPP according to the yaw rate deviation ΔYr calculated in step S17 (step S51). That is, in step S51, the pressure increase gain KAPP is set to be greater when the yaw rate deviation ΔYr is large than when the yaw rate deviation ΔYr is small.

Next, the controller 40 determines whether the road surface on which the vehicle is traveling is a μ-split road surface (step S52). If the road surface is not a μ-split road surface (step S52: NO), the controller 40 sets the right wheel pressure increase amount BP_RR and the left wheel pressure increase amount BP_RL to a predetermined basic pressure increase amount BBP and temporarily ends the process routine.

If the road surface is a μ-split road surface (step S52: YES), the controller 40 determines whether the rear right wheel RR is the high-μ side wheel HFW (step S54). In other words, in step S54, the controller 40 determines whether the rear right wheel RR is the second wheel that is one of the right and left rear wheels RR and RL that has a higher wheel speed VW. If the rear right wheel RR is the high-μ side wheel HFW (step S54: YES), the rear right wheel RR is the second wheel and the rear left wheel RL is the first wheel. Thus, the controller 40 sets the left wheel pressure increase amount BP_RL to the basic pressure increase amount BBP (step S55). Then, the controller 40 multiplies the set left wheel pressure increase amount BP_RL (the basic pressure increase amount BBP) by the pressure increase gain KAPP determined in step S51 and sets the result of multiplication as the right wheel pressure increase amount BP_RR (step S56). The controller 40 then temporarily ends the process routine.

If the rear left wheel RL is the high-μ side wheel HFW (step S54: NO), the rear right wheel RR is the first wheel and the rear left wheel RL is the second wheel. Thus, the controller 40 sets the right wheel pressure increase amount BP_RR to the basic pressure increase amount BBP (step S57). Then, the controller 40 multiplies the set right wheel pressure increase amount BP_RR (the basic pressure increase amount BBP) by the pressure increase gain KAPP determined in step S51 and sets the result of multiplication as the left wheel pressure increase amount BP_RL (step S58). The controller 40 then temporarily ends the process routine.

Referring to the timing diagrams of FIG. 8, operation of the select-low ABS control executed in a vehicle that is travelling straight on a μ-split road surface will now be described. In the following descriptions, it is assumed that, of the right and left rear wheels RR and RL, the rear right wheel RR runs on a low μ road surface, and the rear left wheel RL runs on a high μ road surface.

Figure 8:
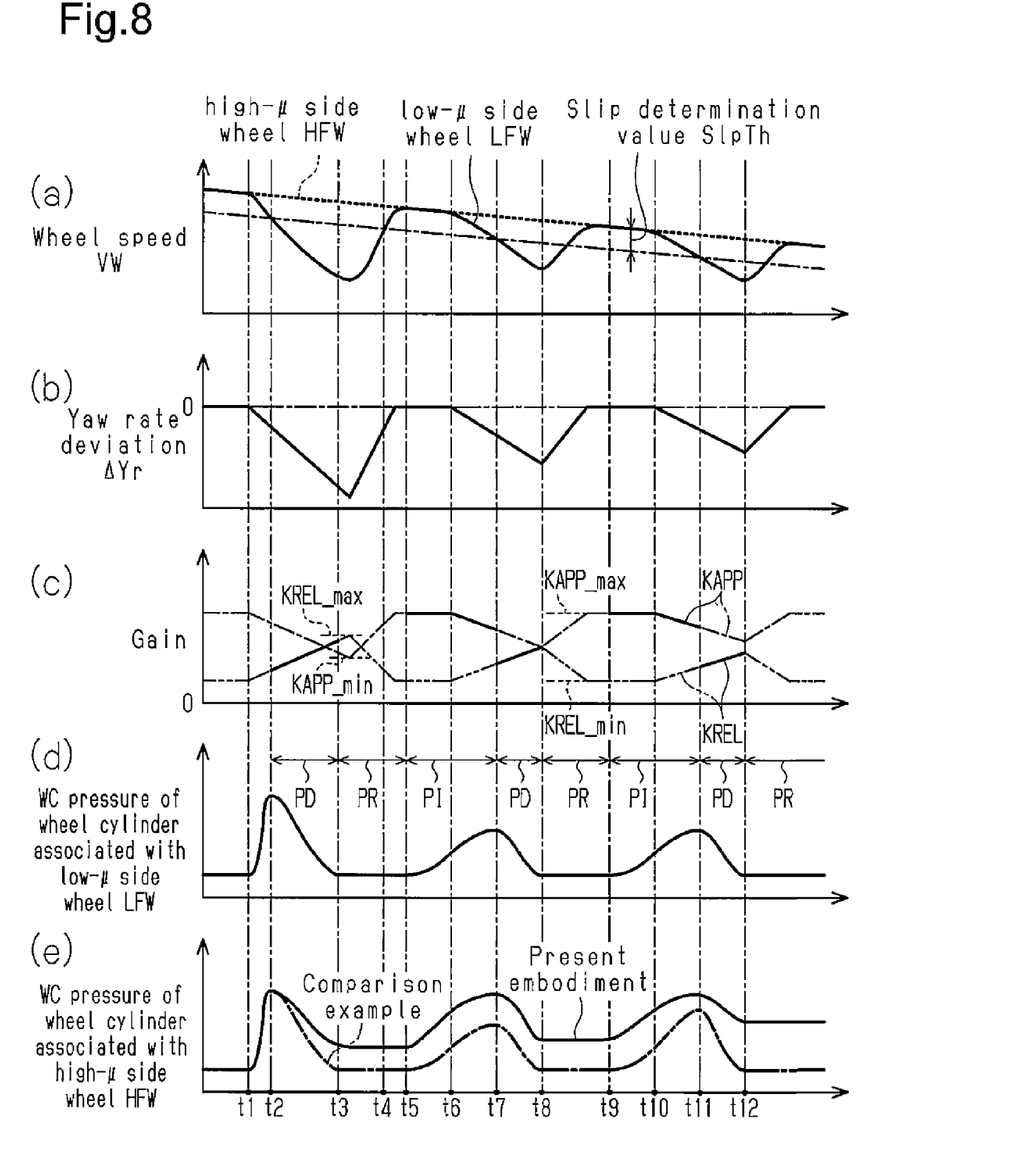
FIG. 8 is a diagram showing changes occurring when the select-low anti-lock brake control is executed in a vehicle travelling on μ-split road surface, in which section (a) is a timing diagram showing changes in the wheel speeds of the low-μ side wheel and the high-μ side wheel, section (b) is a timing diagram showing changes in the yaw rate deviation, section (c) is a timing diagram showing changes in the pressure decrease gain and the pressure increase gain, section (d) is a timing diagram showing changes in the fluid pressure of the wheel cylinder associated with the low-μ side wheel, and section (e) is a timing diagram showing changes in the fluid pressure of the wheel cylinder associated with the high-μ side wheel.

In section (a) in FIG. 8, the wheel speed VW of the low-μ side wheel LFW (the rear right wheel RR in this case) is indicated by the solid line, and the wheel speed VW of the high-μ side wheel HFW (the rear left wheel RL in this case) is indicated by the broken line. During braking by the driver, the rear left wheel RL does not show tendency to lock, and thus the slip amount Slp of the rear left wheel RL is substantially 0 (zero). Thus, the vehicle speed VS of the vehicle is substantially equal to the wheel speed VW of the rear left wheel RL.

FIG. 8 shows in sections (d) and (e) the select-low ABS control of a comparison example. In this comparison example, the WC pressure for the low-μ side wheel LFW is increased and decreased in a similar manner as the present embodiment. However, the pressure increase gradient of the WC pressure for the high-μ side wheel HFW in the pressure increase period PI differs from that of the present embodiment. The comparison example counts the number of times of locking, which is the number of occasions when the slip amount Slp of the low-μ side wheel LFW changes from a value less than the slip determination value SlpTh to a value greater than or equal to the slip determination value SlpTh. When the number of times of locking is less than 2, the pressure increase gradient of the WC pressure for the high-μ side wheel HFW in the pressure increase period PI is set to be equivalent to the pressure increase gradient of the WC pressure for the low-μ side wheel LFW. When the number of times of locking is greater than or equal to 2, the pressure increase gradient of the WC pressure for the high-μ side wheel HFW in the pressure increase period PI is set to be steeper than the pressure increase gradient in the previous pressure increase period PI. However, if the slip amount Slp of the high-μ side wheel HFW becomes greater than or equal to a reference value, which is less than the slip determination value SlpTh, in one control cycle including the previous pressure increase period PI, the pressure increase gradient of the WC pressure for the high-μ side wheel HFW in the current pressure increase period PI is set to be less steep than the pressure increase gradient in the previous pressure increase period PI.

As shown in sections (a), (d) and (e) in FIG. 8, when the driver starts applying the brakes at the first point in time t1, the WC pressures for the low-μ side wheel LFW and the high-μ side wheel HFW are increased. This increases the braking forces on the low-μ side wheel LFW and the high-μ side wheel HFW, and the wheel speeds VW of these wheels start to decrease.

Here, the speed of the low-μ side wheel LFW decreases more rapidly than that of the high-μ side wheel HFW, and the difference in wheel speed between the high-μ side wheel HFW and the low-μ side wheel LFW gradually increases. Accordingly, as shown in section (b) in FIG. 8, the yaw rate deviation ΔYr, which is the parameter indicating the tendency for instability in the vehicle behavior, shifts from 0 (zero) toward the negative side. That is, the yaw rate deviation ΔYr gradually decreases. Thus, as shown in section (c) in FIG. 8, the pressure decrease gain KREL gradually increases and the pressure increase gain KAPP gradually decreases as the yaw rate deviation ΔYr decreases.

As shown in section (a) in FIG. 8, at the second point in time t2, the slip amount Slp of the low-μ side wheel LFW reaches the slip determination value SlpTh, causing the select-low ABS control to start. This decreases the WC pressures for the low-μ side wheel LFW and the high-μ side wheel HFW as shown in sections (d) and (e) in FIG. 8. Here, to promptly eliminate the tendency of the low-μ side wheel LFW to lock, the WC pressure for the low-μ side wheel LFW is decreased rapidly.

The pressure decrease gradient of the WC pressure for the high-μ side wheel HFW differs from the pressure decrease gradient of the WC pressure for the low-μ side wheel LFW. As indicated by the solid line in section (e) in FIG. 8, the pressure decrease amount of the WC pressure for the high-μ side wheel HFW in the current pressure decrease period PD is less than the pressure decrease amount of the WC pressure for the low-μ side wheel LFW. In addition, since the vehicle behavior is determined to be more stable when the yaw rate deviation ΔYr is close to 0 (zero) than when yaw rate deviation ΔYr is far from 0 (zero), the WC pressure for the high-μ side wheel HFW is decreased gradually.

In the comparison example, the pressure decrease gradient of the WC pressure for the high-μ side wheel HFW is the same as that of the WC pressure for the low-μ side wheel LFW as indicated by a long dashed short dashed line in section (e) in FIG. 8. Thus, at the third point in time t3, where the first pressure decrease period PD ends, the WC pressure for the high-μ side wheel HFW of the present embodiment is higher than the WC pressure for the high-μ side wheel HFW of the comparison example. In other words, in the present embodiment, the braking force on the high-μ side wheel HFW in the pressure decrease period PD tends to be greater than that of the comparison example.

In the present embodiment, the pressure decrease gradient of the WC pressure for the high-μ side wheel HFW in the pressure decrease period PD is determined by the yaw rate deviation ΔYr. Thus, when the yaw rate deviation ΔYr gradually decreases like in the period from the second point in time t2 to the third point in time t3, the tendency for instability in the vehicle behavior is assumed to gradually increase. Thus, the pressure decrease gradient of the WC pressure gradually becomes steeper.

The period from the third point in time t3, at which the pressure decrease period PD ends, to the fifth point in time t5 is the pressure keeping period PR, in which the WC pressures for the low-μ side wheel LFW and the high-μ side wheel HFW are kept. In the pressure keeping period PR, the braking force on the low-μ side wheel LFW is held at a small value. This gradually increases the wheel speed VW of the low-μ side wheel LFW and gradually decreases the slip amount Slp as shown in section (a) in FIG. 8. Here, as shown in section (b) in FIG. 8, the yaw rate deviation ΔYr gradually increases toward 0 (zero). In the present embodiment, the yaw rate deviation ΔYr becomes 0 (zero) before the fifth point in time t5 and stays at 0 (zero) until the next sixth point in time t6.

Further, as shown in sections (d) and (e) in FIG. 8, the WC pressure for the high-μ side wheel HFW is greater than the WC pressure for the low-μ side wheel LFW in the pressure keeping period PR. That is, in the pressure keeping period PR of the present embodiment, the braking force on the high-μ side wheel HFW is held at a value greater than that in the pressure keeping period PR of the comparison example. Thus, the overall braking force applied to the vehicle in the pressure keeping period PR is greater than that of the comparison example.

In addition, in the pressure keeping period PR, the wheel speed VW of the low-μ side wheel LFW increases toward the wheel speed VW of the high-μ side wheel HFW. Thus, the slip amount Slp of the low-μ side wheel LFW becomes less than the slip determination value SlpTh at the fourth point in time t4 before the fifth point in time t5. At the fifth point in time t5, the wheel speed VW of the low-μ side wheel LFW becomes substantially equal to the wheel speed VW of the high-μ side wheel HFW. Thus, at the fifth point in time t5, the WC pressures for the low-μ side wheel LFW and the high-μ side wheel HFW start to increase. That is, the period from the fifth point in time t5 to the seventh point in time t7 is the pressure increase period PI.

As shown in section (b) in FIG. 8, in the present embodiment, the yaw rate deviation ΔYr does not change between the fifth point in time t5 and the sixth point in time t6, which is before the seventh point in time t7. Here, since the yaw rate deviation ΔYr is substantially 0 (zero), the pressure increase gain KAPP is set to the maximum value KAPP_max or a value close to the maximum value KAPP_max. Thus, as shown in sections (d) and (e) in FIG. 8, the pressure increase gradient of the WC pressure for the high-μ side wheel HFW is steeper than that of the WC pressure for the low-μ side wheel LFW.

However, as shown in section (a) in FIG. 8, after the sixth point in time t6, the increase in the WC pressure rapidly decreases the wheel speed VW of the low-μ side wheel LFW, and the difference in the wheel speed between the low-μ side wheel LFW and the high-μ side wheel HFW gradually increases. Thus, as shown in section (b) in FIG. 8, the yaw rate deviation ΔYr gradually decreases. As a result, after the sixth point in time t6, the pressure increase gain KAPP gradually decreases, causing the pressure increase gradient of the WC pressure for the high-μ side wheel HFW to gradually become less steep.

As for the comparison example, in the period from the second point in time t2 to the fifth point in time t5, the number of times of locking, in which the slip amount Sip of the low-μ side wheel LFW becomes greater than or equal to the slip determination value SlpTh, is 1. Thus, the pressure increase gradient of the WC pressure for the high-μ side wheel HFW is the same as the pressure increase gradient of the WC pressure for the low-μ side wheel LFW. Accordingly, in the pressure increase period PI from the fifth point in time t5 to the seventh point in time t7, the braking force on the high-μ side wheel HFW is less than that of the present embodiment. In other words, in the present embodiment, the overall braking force applied to the vehicle in the pressure increase period PI is greater than that of the comparison example.

The period from the second point in time t2 to the seventh point in time t7 corresponds to one cycle of the select-low ABS control that repeats process of pressure decrease to pressure increase. In the present embodiment, the braking force on the high-μ side wheel HFW is controlled to be greater than the braking force on the low-k side wheel LFW in one control cycle.

At the seventh point in time t7, the slip amount Slp of the low-μ side wheel LFW becomes greater than or equal to the slip determination value SlpTh, and the WC pressures for the low-μ side wheel LFW and the high-μ side wheel HFW start to decrease. As shown in section (b) in FIG. 8, since the yaw rate deviation ΔYr gradually decreases in the period from the seventh point in time t7 to the eighth point in time t8, the pressure decrease gain KREL gradually increases as the yaw rate deviation ΔYr decreases. However, the pressure decrease gain KREL remains below the maximum value KREL_max (=1). Thus, while becoming less steep with time, the pressure decrease gradient of the WC pressure for the high-μ side wheel HFW in the pressure decrease period PD still remains steeper than the pressure decrease gradient of the WC pressure for the low-μ side wheel LFW (that is, the pressure decrease gradient of the WC pressure for the high-μ side wheel HFW of the comparison example). Accordingly, the present embodiment has a greater braking force on the high-μ side wheel HFW than the comparison example even in the pressure decrease period PD from the seventh point in time t7 to the eighth point in time t8.

When the pressure decrease period PD ends at the eighth point in time t8, keeping of the WC pressures for the low-μ side wheel LFW and the high-μ side wheel HFW starts. That is, the period from the eighth point in time t8 to the next ninth point in time t9 is the pressure keeping period PR like the period from the third point in time t3 to the fifth point in time t5.

When the wheel speed VW of the low-μ side wheel LFW becomes substantially equal to the wheel speed VW of the high-μ side wheel HFW at the ninth point in time t9, the WC pressures for the low-μ side wheel LFW and the high-μ side wheel HFW start to increase. In the present embodiment, in the same manner as the previous pressure increase period PI, the pressure increase gradient of the WC pressure for the high-μ side wheel HFW in the current pressure increase period PI in the period from the ninth point in time t9 to the eleventh point in time t11 is determined by the degree of the yaw rate deviation ΔYr, that is, the pressure increase gain KAPP. The pressure increase gain KAPP is held at the maximum value KAPP_max from the ninth point in time t9 to the tenth point in time t10 before the eleventh point in time t11. However, the pressure increase gain KAPP gradually decreases in the period from the tenth point in time t10 to the eleventh point in time t11. Thus, the pressure increase gradient of the WC pressure for the high-μ side wheel HFW gradually becomes less steep after the tenth point in time t10.

As for the comparison example, the number of times of locking at the low-μ side wheel LFW is 2, and the slip amount Slp of the high-μ side wheel HFW does not become greater than or equal to the reference value in one control cycle including the previous pressure increase period PI. Thus, in the current pressure increase period PI, the pressure increase gradient of the WC pressure for the high-μ side wheel HFW is steeper than the pressure increase gradient of the WC pressure for the low-μ side wheel LFW.

However, in the comparison example, even though the slip amount Slp of the high-μ side wheel HFW in the pressure decrease period PD from the eleventh point in time t11 to the twelfth point in time t12 is substantially 0 (zero), the WC pressure for the high-μ side wheel HFW is decreased rapidly.

In contrast, in the present embodiment, the pressure decrease gradient of the WC pressure for the high-μ side wheel HFW in the pressure decrease period PD from the eleventh point in time t11 to the twelfth point in time t12 is determined by the yaw rate deviation ΔYr, that is, the pressure decrease gain KREL, in the same manner as the previous pressure decrease period PD. Therefore, compared to the comparison example, the pressure decrease gradient of the WC pressure tends to be less steep.

As described above, the present embodiment has the following advantages.

(1) When the select-low ABS control is applied to the rear wheels RR and RL while the vehicle is traveling on a μ-split road surface, the braking force on the high-μ side wheel HFW is greater when the tendency for instability in the vehicle behavior is small than when the tendency for instability in the vehicle behavior is large. Thus, under the condition that the vehicle behavior is stable, the overall braking force applied to the vehicle is increased. Thus, when the select-low ABS control is executed in a vehicle traveling on a μ-split road surface, the deceleration of the vehicle can be increased while ensuring the stability of the vehicle behavior.

(2) If the tendency for instability in the vehicle behavior is large, the braking force on the high-μ side wheel HFW is smaller than when the tendency for instability in the vehicle behavior is small. This limits decrease in the stability of the vehicle behavior.

(3) In the present embodiment, when the tendency for instability in the vehicle behavior is small, the pressure decrease gradient of the WC pressure for the high-μ side wheel HFW in the pressure decrease period PD is less steep than when the tendency for instability in the vehicle behavior is large. That is, in the pressure decrease period PD, the braking force on the high-μ side wheel HFW does not easily decrease. Thus, the overall braking force applied to the vehicle can be increased while satisfying the condition that the tendency for instability in the vehicle behavior is within a permissible range.

(4) In the present embodiment, the pressure increase gradient of the WC pressure for the high-μ side wheel HFW in the pressure increase period PI is steeper when the tendency for instability in the vehicle behavior is small than when the tendency for instability in the vehicle behavior is large. That is, in the pressure increase period PI, the braking force on the high-μ side wheel HFW can easily increase. Thus, the overall braking force applied to the vehicle can be increased while satisfying the condition that the tendency for instability in the vehicle behavior is within a permissible range.

(5) The pressure increase gain KAPP and the pressure decrease gain KREL are updated each time the yaw rate deviation ΔYr changes. When the pressure increase gain KAPP is changed, the pressure increase amount of the WC pressure for the high-μ side wheel HFW is changed during one pressure increase period PI based on the changed pressure increase gain KAPP. Accordingly, in one pressure increase period PI, the stability of the vehicle behavior and the deceleration of the vehicle are both increased compared to when the pressure increase amount of the WC pressure for the high-μ side wheel HFW is fixed to a value that is determined based on the pressure increase gain KAPP at the start of the pressure increase period PI.

In a similar manner, when the pressure decrease gain KREL is changed, the pressure decrease amount of the WC pressure for the high-μ side wheel HFW is changed during one pressure decrease period PD based on the changed pressure decrease gain KREL. Accordingly, in one pressure decrease period PD, the stability of the vehicle behavior and the deceleration of the vehicle are both increased compared to when the pressure decrease amount of the WC pressure for the high-μ side wheel HFW is fixed to a value that is determined based on the pressure decrease gain KREL at the start of the pressure decrease period PD.

(6) If the maximum value KAPP_max of the pressure increase gain KAPP is 2 and the minimum value KAPP_min is 1, the pressure increase gradient of the WC pressure for the high-μ side wheel HFW in the pressure increase period PI is steeper than that of the present embodiment. On the other hand, the WC pressure for the high-μ side wheel HFW after the pressure increase period PI is greater than that of the present embodiment. Thus, in the pressure decrease period PD, the decrease in the WC pressure for the high-μ side wheel HFW is greater than that of the present embodiment. That is, the braking force on the high-μ side wheel HFW tends to increase and decrease to a great extent.

In the present embodiment, the maximum value KAPP_max of the pressure increase gain KAPP is set to be 1.5, which is a value that is less than 2, and the minimum value KAPP_min is set to be 0.5, which is a value that is less than 1. Thus, compared to the case described above, although the WC pressure for the high-μ side wheel HFW after the pressure increase period PI is small, the pressure decrease amount of the WC pressure for the high-μ side wheel HFW in the pressure decrease period PD tends to be small. That is, the braking force on the high-μ side wheel HFW fluctuates within a smaller range. Thus, the braking force applied to the vehicle during the select-low ABS control fluctuates within a smaller range, and the drivability during the select-low ABS control is accordingly improved.

(7) Even when the vehicle is not travelling on a μ-split road surface, execution of the process routines shown in FIGS. 4 to 7 allows the fluctuations of the braking force on one of the right and left rear wheels RR and RL that has a higher wheel speed VW to be adjusted by the yaw rate deviation ΔYr. For example, there may be a case in which the brake performance of the rear right wheel RR is significantly different from the brake performance of the rear left wheel RL. In this case, the wheel with weaker braking tends to have a smaller slip amount Slp and is thus assumed to be the high-μ side wheel HFW. That is, the pressure decrease gradient and the pressure increase gradient of the WC pressure for the wheel with weaker braking are determined by the yaw rate deviation ΔYr. Thus, in a similar manner as when the vehicle is travelling on a μ-split road surface, the deceleration of the vehicle can be increased while ensuring the stability of the vehicle.

In addition, when the wear condition of the tire mounted on the rear right wheel RR significantly differs from the wear condition of the tire mounted on the rear left wheel RL, the fluctuations in the braking force on one of the right and left rear wheels RR and RL that has a higher wheel speed VW can be adjusted by the yaw rate deviation ΔYr.

(8) In the present embodiment, the yaw rate deviation ΔYr is used as the parameter that indicates the tendency for instability in the vehicle behavior. When the vehicle yaw moment resulted from execution of the select-low ABS control is small, the vehicle behavior is determined to be stable, and thus the braking force on the high-μ side wheel is increased. Consequently, the deceleration of the vehicle can be increased while ensuring the stability of the vehicle behavior.

The above described embodiment may be modified as follows.

The tendency for instability in the vehicle behavior may be assumed based on the difference in wheel speed between the front right wheel FR and the front left wheel FL to which the select-low ABS control is not applied. In this case, the greater the difference in wheel speed between the front right wheel FR and the front left wheel FL, the greater the assumed tendency for instability in the vehicle behavior.

The maximum value KREL_max of the pressure decrease gain, the minimum value KREL_min of the pressure decrease gain, the maximum value KAPP_max of the pressure increase gain, and the minimum value KAPP_min of the pressure increase gain may be set as appropriate.

The basic pressure increase amount BBP may be set separately for each of the low-μ side wheel and the high-μ side wheel, and the basic pressure increase amount BBP for the high-μ side wheel may be changed as appropriate. For example, if the slip amount Slp of the high-μ side wheel HFW does not become greater than or equal to the reference value in one control cycle including the previous pressure increase period PI, the basic pressure increase amount BBP for the high-μ side wheel may be changed to a greater value. In this case, the pressure increase gradient of the WC pressure for the high-μ side wheel HFW in the pressure increase period PI is steeper than that of the present embodiment, increasing the overall braking force applied to the vehicle. If the slip amount Slp of the high-μ side wheel HFW becomes greater than or equal to the basic value in one control cycle including the previous pressure increase period PI, the basic pressure increase amount BBP for the high-μ side wheel is preferably changed to a smaller value. This increases the deceleration of the vehicle while ensuring the stability of the vehicle behavior.

The basic pressure decrease amount BDP may be set separately for each of the low-μ side wheel and the high-μ side wheel, and the basic pressure decrease amount BDP for the high-μ side wheel may be changed as appropriate. For example, if the slip amount Slp of the high-μ side wheel HFW does not become greater than or equal to the reference value in one control cycle including the previous pressure decrease period PD, the basic pressure decrease amount BDP for the high-μ side wheel may be changed to a smaller value. In this case, the pressure decrease gradient of the WC pressure for the high-μ side wheel HFW in the pressure decrease period PD is less steep than that of the present embodiment, increasing the overall braking force applied to the vehicle. If the slip amount Slp of the high-μ side wheel HFW becomes greater than or equal to the reference value in one control cycle including the previous pressure decrease period PD, the basic pressure decrease amount BDP for the high-μ side wheel is preferably changed to a greater value. This increases the deceleration of the vehicle while ensuring the stability of the vehicle behavior.

In the pressure increase period PI, the pressure increase gradient for the high-μ side wheel HFW may be determined independent of the yaw rate deviation ΔYr. For example, the duty cycle of control signal given to the solenoid of the booster valve associated with the high-μ side wheel HFW may be equal to the duty cycle of control signal given to the solenoid of the booster valve associated with the low-μ side wheel LFW. In this case, advantages (1) to (3) can be achieved by setting the pressure decrease gradient of the WC pressure for the high-μ side wheel HFW in the pressure decrease period PD to be less steep when the yaw rate deviation ΔYr is large than when the yaw rate deviation ΔYr is small.

In the pressure decrease period PD, the pressure decrease gradient of the WC pressure for the high-μ side wheel HFW may be determined independent of the yaw rate deviation ΔYr. For example, the duty cycle of control signal given to the solenoid of the decompression valve associated with the high-μ side wheel HFW may be equal to the duty cycle of control signal given to the solenoid of the decompression valve associated with the low-μ side wheel LFW. In this case, the advantages (1), (2) and (4) can be achieved by setting the pressure increase gradient of the WC pressure for the high-μ side wheel HFW in the pressure increase period PI to be steeper when the yaw rate deviation ΔYr is large than when the yaw rate deviation ΔYr is small.

When a pressure increase period PI starts, the pressure increase gain KAPP may be fixed to a value that is in accordance with the yaw rate deviation ΔYr determined at the start of the pressure increase period PI. In this case, the duty cycle of control signal given to the booster valve is not changed during one pressure increase period PI. This reduces the control load on the controller 40 during the pressure increase period PI.

When a pressure decrease period PD starts, the pressure decrease gain KREL may be fixed to a value that is in accordance with the yaw rate deviation ΔYr determined at the start of the pressure decrease period PD. In this case, the duty cycle of the control signal given to the decompression valve is not changed during one pressure decrease period PD. This reduces the control load on the controller 40 during the pressure decrease period PD.

As long as the ABS control cycle includes the pressure decrease period PD and the pressure increase period PI, the ABS control cycle does not have to include the pressure keeping period PR.

The select-low ABS control may be applied to the right and left front wheels FR and FL. In this case, the ABS control is preferably applied independently to each of the right and left rear wheels RR and RL.

The brake actuator may be structured such that the wheel cylinders 15a and 15b for the right and left front wheels are coupled to one of the fluid pressure circuits and the wheel cylinders 15c and 15d for the right and left rear wheels are coupled to the other.

The braking device may include an electric brake device that is provided for each of the wheels FR, FL, RR and RL. In this case, the braking force on each of the wheel FR, FL, RR and RL is controlled by adjusting the motor driving force of the associated one of the electric brake devices.

The controller 40 may be installed in a vehicle having three wheels and a vehicle having five or more wheels.

The controller 40 may apply the select-low ABS control to a pair of diagonally opposite wheels, such as a pair of the front right wheel FR and the rear left wheel RL or a pair of the front left wheel FL and the rear right wheel RR.

DESCRIPTION OF THE REFERENCE NUMERALS

40: controller that serves as a brake control device, FR, FL, RR, RL: wheels, LFW: low-μ side wheel that serves as an example of a first wheel, HFW: high-μ side wheel that serves as an example of a second wheel, VS: vehicle speed, VW: wheel speed, Yr: Yaw rate, Yr_Trg: target yaw rate, ΔYr: yaw rate deviation that serves as an example of a difference, PD: pressure decrease period that serves as an example of a decrease period, PI: pressure increase period that serves as an example of an increase period, BDP: basic pressure decrease amount that serves as a basic decrease amount, BBP: basic pressure increase amount that serves as a basic increase amount, KREL: pressure decrease gain that serves as a decrease correction coefficient, KAAP: pressure increase gain that serves as an increase correction coefficient, DP_RR, DP_RL: pressure decrease amount that serves as an example of decrease amount, BP_RR, BP_RL: pressure increase amount that serves as an example of increase amount.

The invention claimed is:

1. A vehicle brake control device that performs select-low anti-lock brake control, in which
in a decrease period, in which braking force on a first wheel that is one of right and left wheels that has a lower wheel speed is decreased, braking force on a second wheel that is one of the right and left wheels that has a higher wheel speed is also decreased, and
in an increase period, in which the braking force on the first wheel increased, the braking force on the second wheel is also increased
wherein the vehicle brake control device is configured such that, when performing the anti-lock brake control, the vehicle brake control device sets the braking force on the second wheel to be greater when a tendency for instability in the behavior of the vehicle is small than when such tendency is large.

2. The vehicle brake control device according to claim 1, wherein a decrease amount of the braking force on the second wheel in the decrease period is set to be smaller when the tendency for instability in the vehicle behavior is small than when such tendency is large.

3. The vehicle brake control device according to claim 2, wherein
the decrease amount of the braking force on the second wheel in the decrease period is set by multiplying a preset basic decrease amount by a decrease correction coefficient, and
the decrease correction coefficient is set to be smaller when the tendency for instability in the vehicle behavior is small than when such tendency is large.

4. The vehicle brake control device according to claim 1, wherein an increase amount of the braking force on the second wheel in the increase period is set to be greater when the tendency for instability in the vehicle behavior is small than when such tendency is large.

5. The vehicle brake control device according to claim 4, wherein
   the increase amount of the braking force on the second wheel in the increase period is set by multiplying a preset basic increase amount by an increase correction coefficient, and
   the increase correction coefficient is set to be greater when a tendency for instability in the vehicle behavior is small than when the tendency for instability in the vehicle behavior is large.

6. The vehicle brake control device according to claim 1, wherein the tendency for instability in the vehicle behavior is determined such that the smaller a difference between a target yaw rate, which is set according to a condition of vehicle operation, and a yaw rate of the vehicle, the smaller the tendency for instability in the vehicle behavior becomes.

* * * * *